Figure 1:
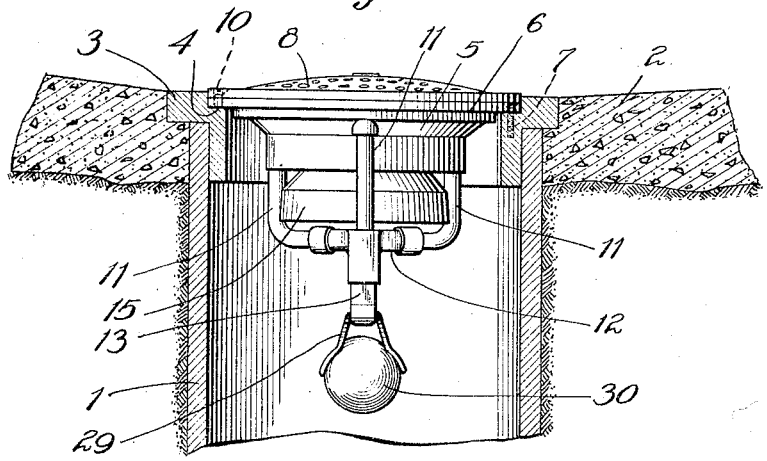

July 14, 1925.

J. HADKA

DRAIN CHECK VALVE

Filed Dec. 17, 1920

1,545,762

2 Sheets-Sheet 1

Inventor
Joseph Hadka
By Miller Chindahl & Parker
Attys

July 14, 1925.  
J. HADKA  
DRAIN CHECK VALVE  
Filed Dec. 17, 1920  
1,545,762  
2 Sheets-Sheet 2
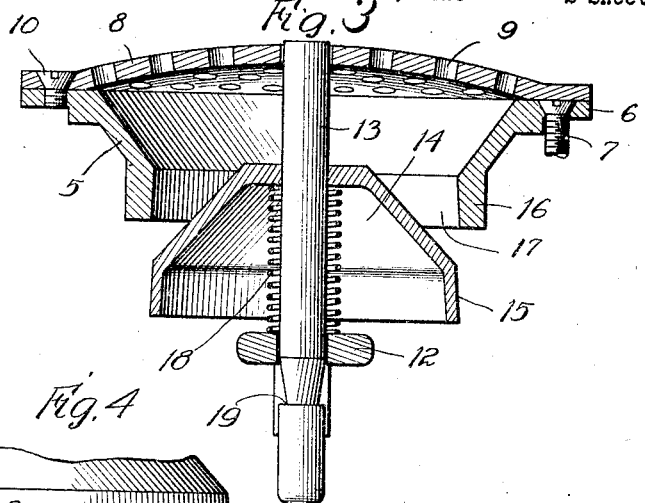
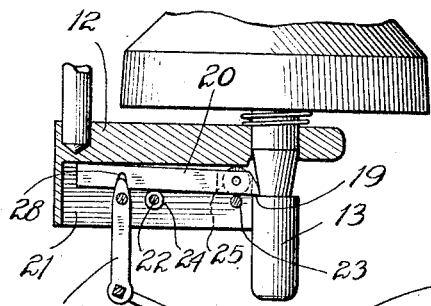
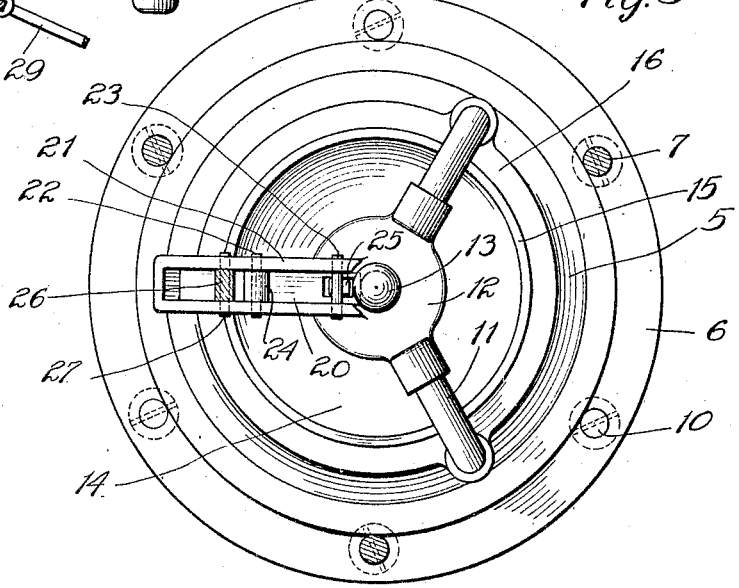
Witness  
John E. Titus
Inventor  
Joseph Hadka  
By Miller Chindahl & Parker  
Attys Patented July 14, 1925.

1,545,762

UNITED STATES PATENT OFFICE.

JOSEPH HADKA, OF OAK PARK, ILLINOIS.

DRAIN CHECK VALVE.

Application filed December 17, 1920. Serial No. 431,525.

*To all whom it may concern:*

Be it known that I, JOSEPH HADKA, a citizen of the United States, residing at Oak Park, in the county of Cook and State of Illinois, have invented certain new and useful Improvements in Drain Check Valves, of which the following is a specification.

The invention relates to drain check valves, and more particularly to such valves as are employed in connection with house drains, for example in the drain pipes leading from the floors of basements.

The primary object of the invention is to provide a check valve which will effectively close a drain outlet against the back flow of sewage and sewer gas in the drain.

Another object of the invention is to provide a structure in which the valve may be operated positively and automatically upon the rise of water, sewage or sewer gas in the drain in which it is installed.

A further object is to provide a valve construction in which the liability of the operating parts being clogged by solid substances in the sewage flowing through it is reduced to a minimum, and in which the valve member is arranged to effect its own clearance when operated.

A further object is to provide a drain valve which may be installed in a floor drain at the mouth of the drain entrance, where it is readily accessible, and may be removed for cleaning and repairs.

Devices of this character heretofore used have been unsatisfactory in that the usual type of check valve is not effective in operation under the conditions obtaining in a drain or sewer. Domestic sewage ordinarily contains a large proportion of solid substances which accumulate about the seat of an ordinary valve, and when caused to operate by a reverse flow in the drain, the valve is so clogged with such substances that it cannot seat and prevent back flow.

Such occurrences are particularly objectionable in basement drains where the failure of a check valve to operate with the flooding or stoppage of a sewer, permits overflow into the basement and frequently causes great damage to goods stored therein.

The ordinary drain valve is generally installed a substantial distance from the mouth of the drain, beneath a floor or under ground in the drain. Under such conditions, an excavation is necessary to clean or repair the valve, and its inaccessible position precludes its being put in operative condition when the contingency occurs which it is designed to prevent before great damage may be done.

In communities where conditions necessitate the laying of sewers with a minimum grade, sudden heavy rain storms overtax the carrying capacity of the sewers, and basements draining into them are flooded with the back flow. The indifferent effectiveness of devices heretofore used to prevent such back flow in basement drains has resulted in large losses.

In my invention I have provided a valve construction which overcomes these deficiencies in the prior devices for preventing overflow from drains. My device is adapted to be mounted in a drainage outlet opening, as in a basement floor, where it is accessible at all times. The valve member and seat are so constructed that the outflow of water draining through the device clears the members of any solid deposits, and are so arranged that the closing of the valve operates to further clear the coacting surfaces of the valve member and seat.

The valve is closed by positive mechanical means with sufficient force to accomplish a complete seal, and its operation is controlled by a float actuated detent which releases the closing mechanism with the first rise of water in the drain.

These features, together with other advantages, will be apparent in the following description of a preferred embodiment of my invention.

Figure 2:
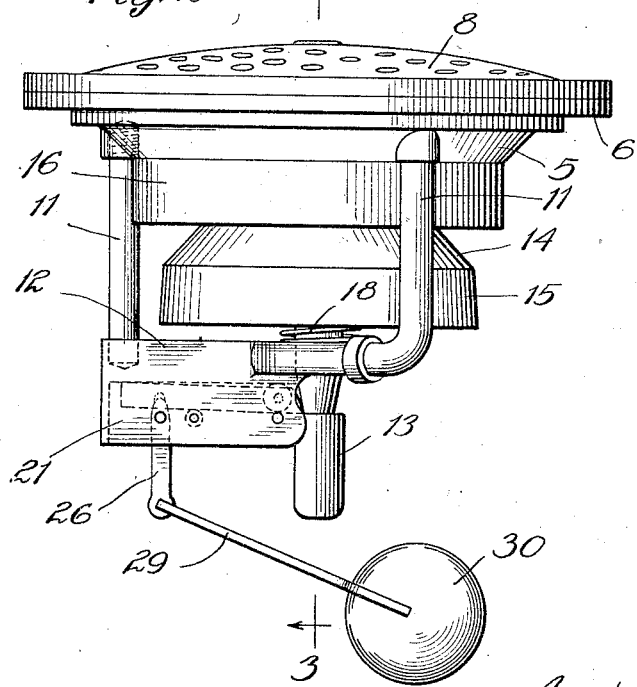

Referring to the drawings, Figure 1 represents my device in elevation as installed in a drain outlet in a floor. Fig. 2 is a side elevation of the device illustrating the assembly of operative parts. Fig. 3 is a vertical sectional view taken on the line 3—3 in Fig. 2, with the float removed. Fig. 4 is a fragmentary sectional view illustrating the trigger mechanism controlling the operation of the valve. Fig. 5 is a view of the bottom of the device without the float.

In Fig. 1 the numeral 1 indicates a soil pipe forming a drainage outlet in a floor 2. The soil pipe carries a collar 3 embedded in and flush with the floor, and having a watertight connection with the soil pipe 1. An annular seat 4 formed in the upper end of the collar supports the valve structure in position with its upper surface substantially flush with the floor.

The valve comprises a casing 5 formed with an annular flange 6 supported on the seat 4 formed in the collar, and detachably secured thereto in water-tight attachment as by means of screws 7. A screen 8 comprising a plate preferably having a convex center portion perforated as at 9 to permit the flow of water therethrough, is detachably secured to the flange 6, as by means of screws 10. Depending rods 11, secured to the underside of the casing 5, support a bridge 12 upon which is mounted the valve operating mechanism. A valve stem 13, supported by the bridge 12 and screen 8, has vertically slidable engagement with those members through apertures formed therein concentric with the vertical axis of the casing 5. A valve member 14 is rigidly mounted on the valve stem, and is shaped with a conical upper portion terminating at its lower edge in an annular flange 15 having a slight upward taper in its circumferential periphery. A downwardly extending flange 16 formed on the casing 5 is adapted to receive the valve member 14 in the closure of the valve. The inner periphery of the flange 16 forms an annular valve seat 17, concentric with the axis of the valve member. The valve seat is of like diameter and taper as the flange 15 of the valve member.

The valve member and seat operatively engage with a combined sliding and wedging action in which the lower edge of the flange 16 tends to clear the face of the valve member as it approaches its seat, of any accumulated deposits, and when completely engaged the wedging action assures a snug fit of the parts and effective seal of the valve aperture.

The valve member is actuated by a compression spring 18, coiled about the stem 13 and having its ends bearing upon the upper surface of the bridge 12 and the under side of the valve member 14. The spring is tensioned to force the valve member 14 upward from the bridge and hold it in snug engagement with its seat. The normal action of the spring is restrained by means of mechanism employed to engage the stem when the valve is fully opened and so hold the valve member out of its seat until the stem is automatically released by the occurrence of a back-flow in the drain. To this end a groove is formed about the lower end of the stem 13 to provide an upwardly facing shoulder 19 having its face substantially perpendicular to the axis of the stem.

A bar 20, horizontally slidable within a housing 21, rigid with the bridge member 12, is arranged to engage the shoulder 19, when the valve is in open position, and prevent the upward movement of the stem. The housing 21 is preferably formed integrally with the bridge member 12, and extends downwardly from the bridge to form a protective canopy surrounding the bar 20 and its associated parts to prevent the lodgment therein of solid substances passing through the valve.

The bar 20 is in sliding contact with the underside of the bridge member 12, being supported in its position by cross pins 22 and 23, extending beneath the bar 20 and carried by the housing 21. The pins may be provided with roller sleeves to minimize friction between the sliding bar and its supports. I have illustrated the pin 22 carrying a sleeve 24, for that purpose.

As additional anti-friction means, a roller 25 may be pivoted in a vertical recess formed in the trigger bar adjacent to its end which engages the valve stem, and adapted to roll upon the underside of the bridge member 12 with the reciprocation of the bar.

The bar 20 is actuated in and out of engagement with the stem 13 by means of the lever 26, pivoted at its fulcrum upon a pin 27 carried by the sides of the housing 21. The upper end of the lever 26 movably engages a transverse slot 28 in the underside of the bar 20. Upon the lower end of the lever 26, a support 29 is rigidly attached and extends in a substantially horizontal position beneath and spaced from the bridge member 12. The outer end of the support 29 carries a float 30 preferably comprising a hollow metal ball. The float 30 swings in a substantially vertical direction, thereby swinging lever 26 about its pivot 27, and causing the bar 20 to reciprocate.

In the operation of my device, after its installation, it may be determined whether the valve is open or closed by the position of the valve stem 13 which extends upwardly through the screen 8 for a substantial distance when the valve is closed. The valve is set in normal open position by pushing down the stem 13 and thereby compressing the spring 18 until the bar 20 engages the shoulder 19 in the lower end of the stem. The weight of the float 30 normally operates the lever 26 to force the bar 20 against the stem 13, causing the bar and shoulder to engage when in register.

Water flowing through the valve and passing over the bridge member and float from above will not disturb the engagement of the bar and stem, and the relative flow carrying capacity of the valve and soil pipe 1 is such that the water will immediately flow away without filling the soil pipe. When, from any cause, a back-flow of water, for example, occurs in the drain, the soil pipe 1 will fill and as soon as the level of the rising water reaches the float 30 the latter will rise therewith and operate to withdraw the bar 20 from the shoulder 19 in the stem. Upon release of the stem, the spring 18 forcibly drives the valve member 14 into its seat, and effectively seals the drain outlet against the back-flow of sewage from the drain. Although particularly intended to check the back-flow of sewage, the valve when properly installed is also sufficiently sensitive to close against the escape of sewer gas from the drain at least in those cases where these gases are present in such volumes that they would constitute a serious nuisance if permitted to escape through the drain outlet into the basement. In the event of such back-flows of either gas or liquid substance it will be seen that the recessed under side of the valve will tend to assist in the closing of the valve, as, for example, where the spring after long usage may have broken or become too weak to close the valve under its own action.

The protrusion of the stem 13 constitutes a signal that the valve is closed, and upon the subsidence of the overflow it may be reset as previously described.

While I have illustrated and described in detail a preferred embodiment of my invention, I desire it to be understood that the disclosure is merely for purposes of illustration, and that many modifications and variations will naturally occur to those skilled in the art. I aim in the subjoined claims to cover all such legitimate variations and modifications.

I claim as my invention:

1. A check valve for drains adapted to be mounted to operate in the opening for the drain to prevent back-flows therefrom comprising a screen to fit said drain opening, a valve beneath the same, a seat for said valve thereabove, a manually operable plunger rigid with said valve and movable through said screen, an automatically operating catch to hold said valve in open position, float-controlled means operatively associated with said catch to be operated upon the occurrence of a back-flow toward said drain opening to release said catch and permit said valve to close, and means tending to close said valve, the plunger in the open position of the valve being flush with the screen.

2. A drain check valve comprising, in combination, a casing adapted to be secured in the opening of a drain outlet and having a valve seat, a valve member movably supported on said casing and having a compression spring associated therewith adapted to move said member into engagement with said seat, a detent carried by said casing arranged to restrain said valve member out of engagement with said seat, and a float operable to release the detent upon being lifted by a reversal of flow in said drain.

3. A drain check valve adapted to be mounted in a drain outlet and having, in combination, a casing having a valve seat and an outlet passage therethrough, a screen mounted on the casing, a support carried by said casing and spaced from said seat, a valve member having a fixed stem slidably engaging said support and said screen, means tending normally to move said valve member into engagement with said seat, a detent mounted on said support and arranged to engage said stem and restrain said valve member out of engagement with said seat, and float operated means for releasing said detent and permitting the automatic closing of said valve member upon its seat.

4. A drain check valve adapted to be installed in a drain outlet in a floor, and having, in combination, a collar positioned in the floor and forming the mouth of said outlet, a casing supported on said collar having a passage therethrough, an annular flange depending from the casing and forming a valve seat, a screen mounted over the passage, depending arms fixed to the casing and having their lower ends bridged by a support spaced from said valve seat, a vertical stem positioned in said passage and slidably supported in said screen and said support, said stem having an annular shoulder on its lower portion, a conical valve member carried by said stem, resilient means tending to move said member into engagement with said seat, a detent slidably mounted on said support and detachably engaging said shoulder to hold said valve member and seat out of engagement, and automatic means for releasing the detent.

5. A check valve adapted to be mounted in a drainage outlet, comprising, in combination, a casing having a passage and a valve seat in the passage, a support carried by the casing, a valve stem having a sliding bearing in said support and carrying a valve member adapted to engage said valve seat to close the passage, a spring element associated with said valve member and tending to close said member upon its seat, a shoulder formed on said stem, a sliding bar mounted on said support and adapted to engage said shoulder and hold the valve member in open position, a lever pivoted on said support and engaging said bar to move the bar into and out of engagement with said shoulder, and a float fixed on said lever, said float being adapted to swing the lever on its pivot with the rise of liquid or gas in said drainage outlet and release said bar from engagement with said shoulder.

6. A check valve for a drain outlet comprising, in combination, a casing having a passage formed therein, a support carried by the casing, a stem slidable in said support and carrying a valve member operable by spring tension to close said passage, a sliding bar mounted in a housing on said support and adapted to engage and releasably hold said stem with said valve member in open position, said housing and sliding bar having antifriction rollers for the support of said bar, a lever pivoted in said housing and having one end pivotally connected to said sliding bar and having the other end extending substantially perpendicular to the axis of said outlet, and a float fixed to the latter end of said lever and freely suspended in said outlet.

7. A check valve for a drain outlet comprising, in combination, a casing, a conical valve seat formed in the casing, a conical valve member supported on the casing and adapted to slidably engage said valve seat, said valve member having a recess formed in its base, a compression spring mounted in the recess and tending to move said member into engagement with said seat, automatically releasable means for holding said valve member out of engagement with said seat, and a plunger on said valve member above said seat to effect opening of the valve for engaging said releasable means.

8. A check valve for a drain outlet comprising, in combination, a casing, an annular flange on said casing having a slight taper forming a conical valve seat, a conical valve member supported on the casing, said valve having likewise an annular flange thereon with a similar taper whereby it is adapted to slidably engage said valve seat with a wiping action, a compression member associated with said valve member and tending to move said member into engagement with said seat, automatically releasable means for holding said valve member out of engagement with said seat, and a plunger on said valve member above said seat to effect opening of the valve for engaging said releasable means.

9. A check valve for a drainage opening comprising a casing, a screen thereon, a valve seat in said casing, a valve member movable toward the screen to close on said seat, means rigid with the casing to support said valve member from the under side, means normally operating to close said valve, a latch associated with said valve member to hold the same open, automatic means to release the latch by a flow toward the valve, and a member associated with the valve to move therewith extending through the screen to open the valve to the latched position.

10. A check valve for drains adapted to be mounted in a floor to prevent back-flow from a drain therefrom comprising a screen set in the drain opening and arranged substantially flush with the floor, a valve member beneath said screen, a seat for said valve member between the latter and the screen, a plunger movable through the screen by the closing of the valve on its seat, a compression spring associated with the valve normally tending to force the same against its seat, the plunger being arranged to be depressed to a position flush with the screen to compress the spring, and a float releasable catch arranged automatically to hold the valve in the flush position of the plunger in the absence of a back-flow toward the drain.

In testimony whereof, I have hereunto set my hand.

JOSEPH HADKA.